(12) United States Patent
Jordan et al.

(10) Patent No.: US 10,615,553 B2
(45) Date of Patent: Apr. 7, 2020

(54) BUSBAR SYSTEM FEATURING EXTERNALLY CRIMPED CONNECTIONS FOR ELECTRICAL CONTACTS

(71) Applicant: ARCIMOTO, INC., Eugene, OR (US)

(72) Inventors: James Jordan, Junction City, OR (US); David Boyd, Portland, OR (US); Jove Lachman-Curl, Eugene, OR (US)

(73) Assignee: ARCIMOTO, INC., Eugene, OR (US)

( * ) Notice: Subject to any disclaimer, the term of this patent is extended or adjusted under 35 U.S.C. 154(b) by 0 days.

(21) Appl. No.: 16/051,356

(22) Filed: Jul. 31, 2018

(65) Prior Publication Data

US 2019/0036283 A1    Jan. 31, 2019

Related U.S. Application Data

(60) Provisional application No. 62/539,209, filed on Jul. 31, 2017.

(51) Int. Cl.
| | |
|---|---|
| *H01R 25/16* | (2006.01) |
| *H01R 4/18* | (2006.01) |
| *H02G 5/10* | (2006.01) |
| *H01M 2/20* | (2006.01) |
| *H01M 2/10* | (2006.01) |

(52) U.S. Cl.
CPC .......... *H01R 25/162* (2013.01); *H01R 4/182* (2013.01); *H02G 5/10* (2013.01); *H01M 2/1077* (2013.01); *H01M 2/202* (2013.01)

(58) Field of Classification Search
CPC ........ H01R 25/16; H01R 25/162; H01R 4/18; H01R 4/182; H01R 25/142; H02B 1/36; H02G 5/00; H02G 5/06; H02G 5/10; H01M 2/1077; H01M 2/202

USPC ............... 174/70 B; 701/305; 339/22
See application file for complete search history.

(56) References Cited

U.S. PATENT DOCUMENTS

| | | | | |
|---|---|---|---|---|
| 3,018,320 | A * | 1/1962 | Rowe ................. | H02G 5/06 174/99 B |
| 3,268,848 | A * | 8/1966 | Adams ................ | H02B 1/36 439/114 |
| 6,380,477 | B1 | 4/2002 | Curtin | |
| 2010/0248010 | A1 | 9/2010 | Butt et al. | |

(Continued)

OTHER PUBLICATIONS

"List of TERMI-FOIL Models and Products" TE Connectivity, Available Online at www.te.com/usa-en/plp/termi-foil/ZnjK.html, Retrieved on Aug. 16, 2018, 6 pages.

*Primary Examiner* — Timothy J Thompson
*Assistant Examiner* — Guillermo J Egoavil
(74) *Attorney, Agent, or Firm* — Alleman Hall Creasman & Tuttle LLP (57) ABSTRACT

A busbar system comprises an electrically conductive busbar having multiple ridges that project from a first side of the busbar. Each ridge defines a channel having an opening on a second side of the busbar. Interior facing surfaces of each ridge that define the channel are substantially smooth and/or free of protrusions or teeth prior to the ridge being externally crimped. The busbar system further comprises multiple electrically conductive electrical contacts having a substantially broad and thin configuration, wherein one or more of the electrical contacts are secured within each channel of the busbar by the ridge being externally crimped by a tool having surfaces that include one or more protrusions.

20 Claims, 5 Drawing Sheets

(56) References Cited

U.S. PATENT DOCUMENTS

2012/0017021 A1* 1/2012 Keegan ............... H01R 25/142
710/305
2015/0064546 A1* 3/2015 Murakami .......... H01M 2/1077
429/159

* cited by examiner

BUSBAR SYSTEM FEATURING EXTERNALLY CRIMPED CONNECTIONS FOR ELECTRICAL CONTACTS

CROSS REFERENCE TO RELATED APPLICATIONS

This non-provisional application claims priority to U.S. provisional patent application Ser. No. 62/539,209, filed Jul. 31, 2017, titled "BUSBAR SYSTEM FEATURING EXTERNALLY CRIMPED CONNECTIONS FOR ELECTRICAL CONTACTS", the entire contents of which is incorporated herein by reference for all purposes.

BACKGROUND

Within electrical systems, a busbar (also referred to as a bus bar, buss bar, or bussbar) is an electrically conductive element to which multiple electrical contacts may be attached. A busbar may be used to distribute and/or combine an electrical ground or an electrical potential with respect to multiple electrical sources and/or electrical sinks. A busbar may further provide a thermal pathway for dissipating heat rejected by electrical sources and/or electrical sinks that are connected to the bus bar. As an example, a bus bar may be included within a battery system that contains an array of many batteries that are in electrical contact with the busbar. A busbar is typically formed from a metallic material having substantially more mass and substantially greater cross-section than the individual electrical contacts that connect the electrical sources and/or sinks to the busbar.

SUMMARY

A busbar system comprises an electrically conductive busbar having multiple ridges that project from a first side of the busbar. Each ridge defines a channel having an opening on a second side of the busbar. Interior facing surfaces of each ridge that define the channel are substantially smooth and/or free of protrusions or teeth prior to the ridge being externally crimped. The busbar system further comprises multiple electrically conductive electrical contacts having a substantially broad and thin configuration, wherein one or more of the electrical contacts are secured within each channel of the busbar by the ridge being externally crimped by a tool having surfaces that include one or more protrusions.

DETAILED DESCRIPTION

The present disclosure is directed to a busbar system that features externally crimped connections for electrical contacts. The disclosed busbar system includes an electrically conductive busbar that accommodates many electrically conductive electrical contacts that are secured to the busbar by externally crimped connections. These externally crimped connections may be achieved using a tool that includes protrusions on the tool's clamping surfaces rather than relying on pre-formed protrusions or teeth on the busbar or electrical contacts. The externally crimped connections provide improved transfer of electrical energy and/or heat energy across the boundary of the busbar and electrical contacts, and further supports the use of dissimilar materials across this boundary.

Figure 1:
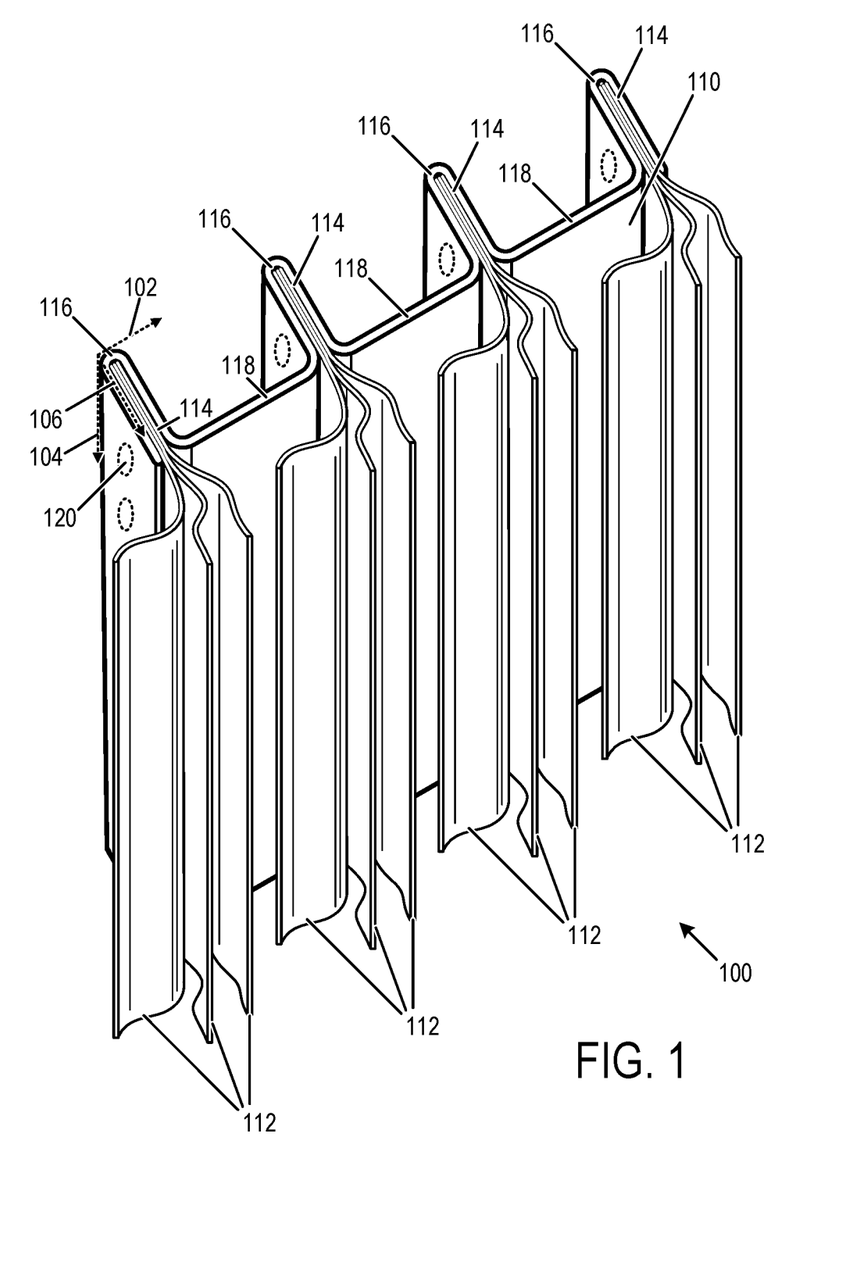
FIG. 1 depicts an example busbar system in accordance with an aspect of the present disclosure.

FIG. 1 depicts an example busbar system 100 in accordance with an aspect of the present disclosure. Busbar system 100 may be used within the context of a battery array, as a non-limiting example. However, it will be understood that busbar system 100 may be used in other suitable contexts to conduct electrical energy and/or heat with respect to any quantity and/or configuration of electrical/heat sources or sinks.

Busbar system 100 includes a busbar 110 and a plurality of electrical contacts 112. Busbar 110 and electrical contacts 112 are each formed from one or more electrically conductive materials. Non-limiting examples of electrically conductive materials include metals such as steel, copper, nickel, silver, gold, aluminum, or combinations thereof, to name just a few examples. However, other suitable electrically conductive materials may be used. In at least some implementations, the busbar may be formed from a different material or a different combination of materials than some or all of the electrical contacts. As a non-limiting example, the busbar may be formed from aluminum and the electrical contacts may be formed from copper. The use of dissimilar materials may make welding of electrical contacts to the busbar difficult or costly, and may increase electrical and/or thermal resistance across this boundary. The externally crimped connections of the present disclosure may make manufacture of the busbar system easier and less costly, and may reduce electrical and/or thermal resistance across the boundaries between busbar 110 and electrical contacts 112.

Busbar 110 defines or otherwise includes a plurality of parallel channels 114 on a first side (i.e., front face) of the busbar within which electrical contacts 112 may be secured by externally crimping opposing exterior sides of ridges 116 to establish respective electrical connections. In the example depicted in FIG. 1, busbar 110 is formed from a single piece of material that defines channels 114 within respective ridges 116 in the material of the busbar that project outward from a planar surface 118 on an opposite side (i.e., a rear face) of the busbar from the front face having respective openings to the channels 114.

Figure 6:
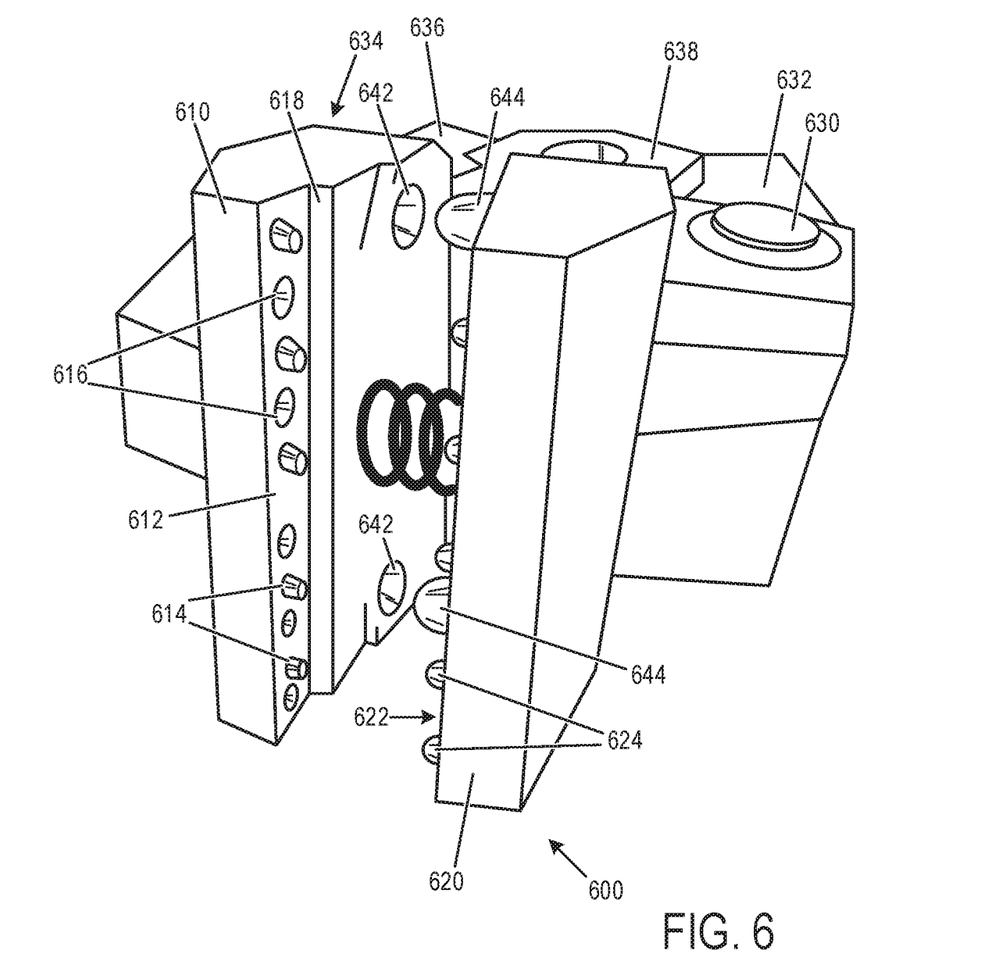
FIG. 6 depicts an example tool to establish an electrical connection between electrical contacts and the example busbar of FIG. 1.

One or more electrical contacts 112 may be secured within each channel 114 by externally crimping opposing exterior sides of ridges 116 inward using a tool, such as depicted in FIG. 6. For example, FIG. 1 depicts each of channels 114 including multiple (e.g., three electrical contacts). In this example, the electrical contacts take the form of electrically conductive foil, ribbon, or sheet material having a broad, yet thin configuration (thinnest dimension 102), thereby enabling multiple electrical contacts to be sandwiched or layered between opposing interior side walls of the ridge that defines each channel. In at least some implementations, the electrical contacts may have a width (first dimension 104) that is the same as or less than the width of busbar as measured in a direction parallel to ridges 116/channels 114. Each channel may have an opening width between opposing interior sidewalls that is defined to accommodate any suitable quantity of electrical contacts. While busbar system 100 includes three electrical contacts 112 per channel 114 in a sandwiched or layered configuration, in other examples a busbar system may include two, four, five, six or more electrical contacts per channel in a sandwiched or layered configuration.

In a first example, busbar 110 may be formed by bending or folding an initially planar piece of material to obtain ridges 116 and channels 114. In a second example, busbar 110 may be formed by extruding a material through a die along a direction that is parallel to the ridges and channels. In a third example, busbar 110 may be formed by casting or molding. As depicted in FIG. 1, busbar may be formed from a material having a substantially constant width or thickness as viewed in profile, thereby providing a substantially constant material cross-section (even across ridges/channels) for conducting electrical energy and/or heat. FIG. 1 depicts an example in which a thickness of the material from which busbar 110 is formed is substantially thicker than a thickness of individual electrical contacts 112 (as measured across its thinnest dimension 102). Continuing with this example, all other length dimensions of each electrical contact 112 may be greater than the thickness of the material from which busbar 110 is formed. For example, each electrical contact 112 has a greater length (first dimension 104) as measured along channel 114 and a greater length (second dimension 106) as measured from an interior of channel 114 to a distal end projecting from the front face of the busbar as compared to the thickness of the material from which the busbar 110 is formed. Hence, electrical contacts 112 are in contrast to thin wires, which may have a smaller thickness in each cross section as compared to the thickness of the material from which the busbar is formed. However, in other examples, wires having a circular cross-section may be used in place of the electrical contacts 112 depicted in FIG. 1, depending on implementation.

A desired quantity of electrical contacts may be inserted into each channel, and a clamping force may be applied on opposing exterior side walls of each ridge to cause deformation of that ridge and/or electrical contacts contained within its channel, thereby securing the electrical contacts to the busbar through an externally crimped connection (e.g., indicated at 120). In contrast to other types of crimped electrical connections that rely on pre-formed teeth or protrusions formed within or by the material being crimped, interior facing surfaces of ridges 116 that form channels 114 may be initially smooth and/or have the same surface texture as other portions of the busbar material, thereby enabling insertion of electrical contacts (including relatively thin ribbon, foil, or sheet-type contacts) into the channel without snagging or substantial resistance. This configuration may further reduce manufacturing costs, for example. A remaining portion (distal end) of each of the electrical contacts protruding from the busbar channels (as depicted in FIG. 1) may be connected to electrical sources or sinks, such as a battery terminal, for example. Each electrical contact may protrude or project from a front face of the busbar by the same or different length, depending on implementation to support a variety of two-dimensional or three-dimensional arrays. The connection of the electrical contacts to electrical sources or sinks may be formed by welding in at least some implementations. Within such welding configurations the material for the electrical contacts may be selected to be the same or similar as or otherwise compatible with the terminals of the sources or sinks with respect to the selected welding technology to thereby provide adequate connectivity in terms of strength, longevity, electrical resistance, and heat transfer.

Figure 2:
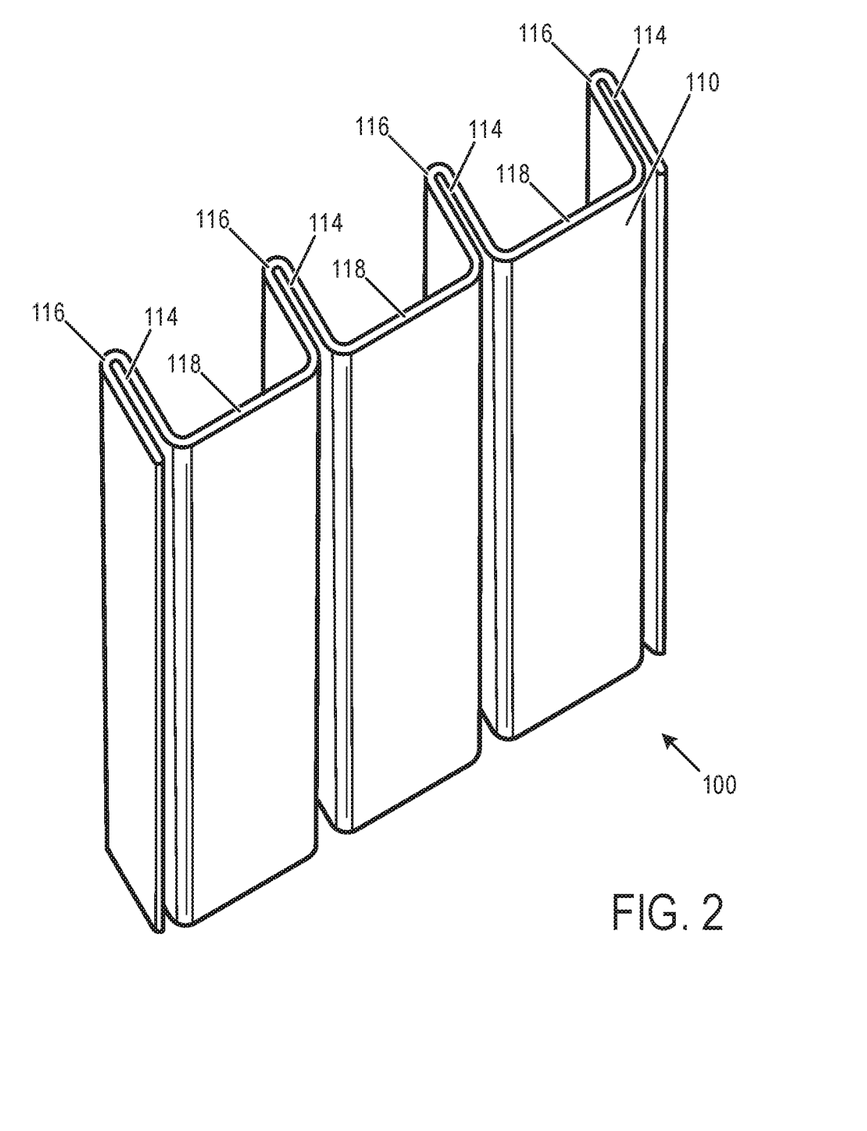
FIG. 2 depicts the example busbar of FIG. 1 with the electrical contacts removed from the busbar system.

FIG. 2 depicts the example busbar 110 of FIG. 1 with the electrical contacts 112 removed from busbar system 100. While busbar 110 is depicted as including four parallel channels 114, it will be understood that the busbar may include one, two, three, five, or more parallel channels 114 formed within respective ridges 116. Furthermore, it will be understood that a length dimension of busbar 110 may be substantially longer or shorter than the relative length depicted in FIG. 2 in relation to its width dimension (perpendicular to ridges 116). For example, the busbar may have a length that is several, ten, a hundred or more times a length dimension as compared to a width dimension.

Figure 3:
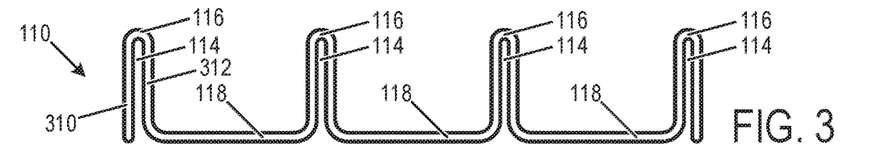
FIG. 3 depicts a cross-sectional view of the example busbar of FIG. 1.

FIG. 3 depicts a cross-sectional view of the example busbar of FIG. 1. An example ridge 116 is depicted with reference numerals 310 and 312 referring to opposing side walls that form channel 114. A distance between interior faces of side walls 310 and 312 corresponding to a width of channel 114 may be selected or otherwise configured to accommodate a particular quantity and/or thickness of electrical contacts (e.g., 112 of FIG. 1) in a sandwiched or layered configuration. FIG. 3 further depicts ridges 116 protruding from a rear face of planar surface 118 in a generally orthogonal configuration.

Figure 4:
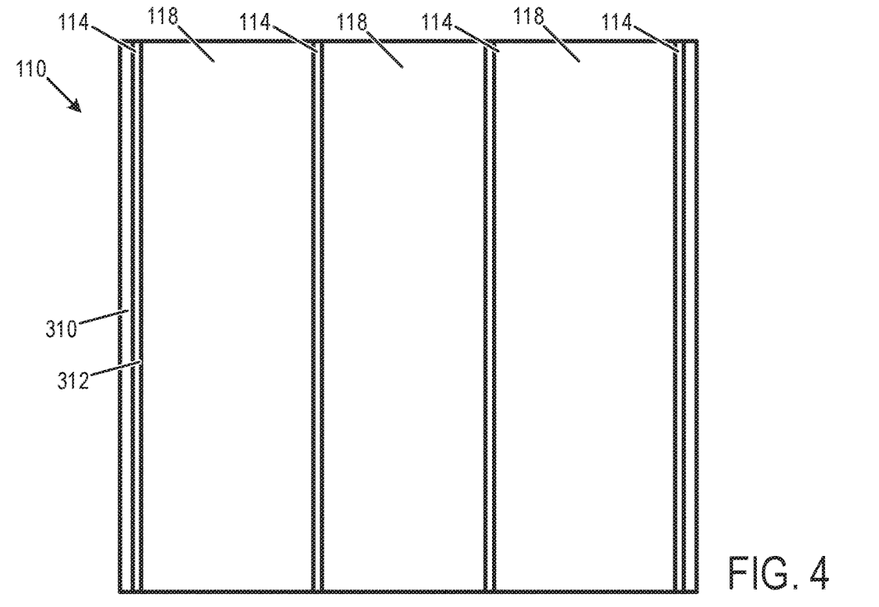
FIG. 4 depicts a front face of the example busbar of FIG. 1.

FIG. 4 depicts the front face of the example busbar of FIG. 1. In FIG. 4, channels 114 are parallel to each other and extend along a length dimension of busbar 110. As previously described, the busbar may include fewer or greater quantities of channels 114, depending on implementation.

Figure 5:
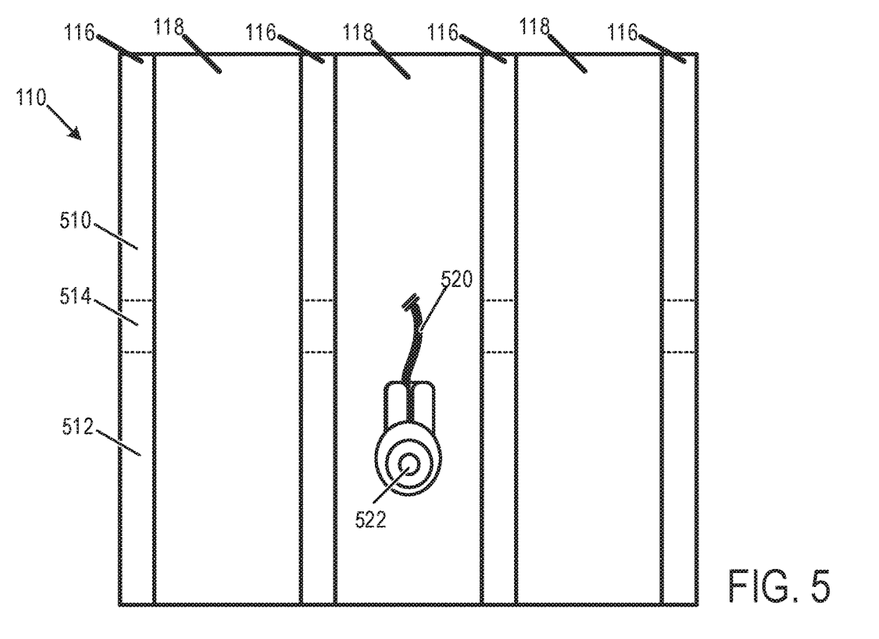
FIG. 5 depicts a rear face of the example busbar of FIG. 1.

FIG. 5 depicts the rear face of the example busbar of FIG. 1. In FIG. 5, ridges are parallel to each other and extend along a length dimension of busbar 110. As previously described, the busbar may include fewer or greater quantities of ridges 116, depending on implementation. FIG. 5 also depicts an example of an electrical connection to the busbar on the rear side opposite the electrical contacts in the form of a wire 520 (or other suitable conductor) physically fastened to planar surface 118 as indicated at 522. Wire 520 may be associated with an electrical ground reference or electrical source/sink, depending on implementation. In an example, the wire may be crimped onto a fastener that is bolted, riveted, or screwed to the busbar. In some examples, multiple wires may be fastened to the busbar at two or more locations to provide additional electrical pathways to ground or electrical source/sink.

In at least some implementations, the busbar may include multiple ridge segments having an aligned axis with each other along a length dimension of the busbar. For example, two or more ridge segments having an aligned axis may be separated from each other by a gap. Within FIG. 5, an example gap 514 is depicted between ridge segments 510 and 512 of an example ridge 116. According to this example, the busbar could include eight ridge segments with each pair of ridge segments being aligned along a common axis that corresponds to one of ridges 116. Gap 514 may be formed by cutting away part of the ridge, as an example. However, other suitable techniques may be used to create ridge segments. Each ridge segment may accommodate one or more electrical contacts as previously described with reference to FIGS. 1-5. For example, ridge segment 510 may include a first set of one or more electrical contacts in a sandwiched or layer configuration within its respective channel located on an opposite side of the busbar, and ridge segment 512 may include a second set of one or more electrical contacts in a sandwiched or layered configuration within its respective channel located on an opposite side of the busbar. According to this example, the busbar could include eight sets of electrical contacts. However, in another example, a set of one or more electrical contacts may span two or more ridge segments sharing a common axis, such as ridge segments 510 and 512. In this configuration, the set of electrical contacts may be visible on the rear side of the busbar within the gap 514. A busbar may include any suitable quantity of ridge segments in an aligned axis, and any suitable quantity of ridges in an axis that is orthogonal to an axis of the ridges. However, it will be understood that a busbar may include only a single ridge along its length in another example, with zero, one or more additional ridges running parallel to that single ridge. Therefore, a busbar may provide an electrical and/or thermal interconnect for a two-dimensional or even three-dimensional array of any suitable quantity of electrical/heat sources and/or sinks.

FIG. 6 depicts an example tool 600 to secure one or more electrical contacts to a busbar (e.g., busbar 110 of FIGS. 1-5) by external crimping, to thereby establish an electrical connection therebetween. Tool 600 includes a first arm 610 having a first interior face 612 and a second arm 620 having a second interior face 622. First arm 610 and second arm 620 are moveable relative to each other to provide a clamping force onto a ridge (e.g., ridge 116) of the busbar and the electrical contact(s) (e.g., 112) contained within an interior channel (e.g., 114) of that ridge.

In at least some implementations, second arm 620 may be rotatably mounted to a fixture 638 by a pin or hinge 630, and first arm 610 may be rotatably mounted to fixture 638 by the same pin or hinge, or by another pin or hinge 634 (not visible in FIG. 6). This double pivot or hinged configuration (e.g., using hinges 630, 634) enables interior faces of the tool to remain substantially parallel to each other throughout the clamping operation. Each arm may include a respective handle or other input element upon which an input force may be applied to rotate the arm relative to the fixture. For example, first arm 610 includes a first handle 636 and second arm 620 includes a second handle 632. The tool may be manually operated by a user through handles 632 and 636 or a mechanical actuator (e.g., hydraulic/pneumatic/electromagnetic, etc.) may be used to provide an input force to the tool during a clamping operation.

Each interior face of tool 600 may include one or more protrusions that provide a localized region of increased deformation (i.e., crimping) along the ridge and electrical contacts contained therein. For example, first interior face 612 includes protrusions 614 that are spaced apart from each other and distributed along an axis that is aligned with an axis of the ridge being clamped. In this example, first interior face 612 includes five protrusions, however, other suitable quantities of protrusions may be used. Second interior face 622 includes protrusions 624 that are spaced apart from each other and distributed along an axis that is aligned with an axis of the ridge being clamped. In this example, second interior face 622 also includes five protrusions, however, other suitable quantities of protrusions may be used.

Interior faces 612 and 622 may further include indentations that are each configured to accommodate a respective protrusion of an opposing interior face of the tool. For example, first interior face 612 includes indentations 616 that accommodate protrusions 624 of second interior face 622. Similarly, second interior face 622 includes indentations (not visible in FIG. 6) that accommodate protrusions 614 of first interior face 612. These indentations are also spaced apart from each other and distributed along the same axis as the protrusions of the same interior face. As depicted in FIG. 6, the indentations are interspersed with the protrusions along the first interior face 612 such that a sequence of alternating protrusions and indentations are distributed along the axis at equal intervals. Second interior face 622 may have the same configuration with regards to the protrusions and indentations, with the exception that its sequence of alternating protrusions and indentations is opposite the first interior face 612 to enable indentations of an interior face to accommodate corresponding protrusions of the other interior face, and vice-versa.

Each interior face of tool 600 may be at least partially defined by a ridge or step of the arm of the tool that assists in the alignment of the ridge of the busbar during a clamping operation. For example, a ridge or step 618 is depicted in FIG. 6 with respect to first interior face 612. Second arm 620 may similarly include a ridge or step. The height of the ridge or step may be the same or similar to the height of the protrusions in at least some implementations. Interior facing and opposing surfaces of the ridge or step of each arm may contact each other during a clamping operation to limit an amount of deformation that is applied to the ridge of the busbar and the electrical contacts contained therein.

Tool 600 may include one or more spring elements disposed between first arm 610 and second arm 620 that assist in returning the arms to an open or unclamped position after a clamping operation. Tool 600 may include one or more additional protrusions and/or corresponding indentations (e.g., at 642 and 644) within the interior facing and opposing surfaces of the of the ridge or step of the arms to maintain alignment of the arms during the clamping operation.

Figure 7:
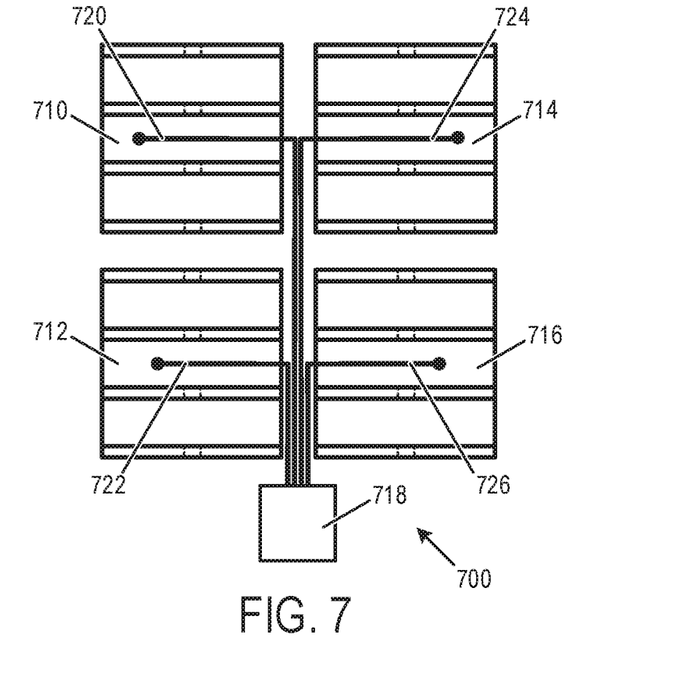
FIGS. 7 and 8 depict an example battery system.

FIG. 7 depicts an example battery system 700 that incorporates a busbar system formed by a plurality of busbars 710, 712, 714, 716, etc. Busbar 110 described above is a non-limiting example of the busbars of battery system 700. Each busbar is electrically connected to an electrical source/sink 718 via respective electrical pathways (e.g., wires) 720, 722, 724, 726, etc. Each of these electrical pathways may correspond to previously described wire 520, as an example. In FIG. 7, a rear face of each busbar is visible, such as depicted in FIG. 5.

Figure 8:
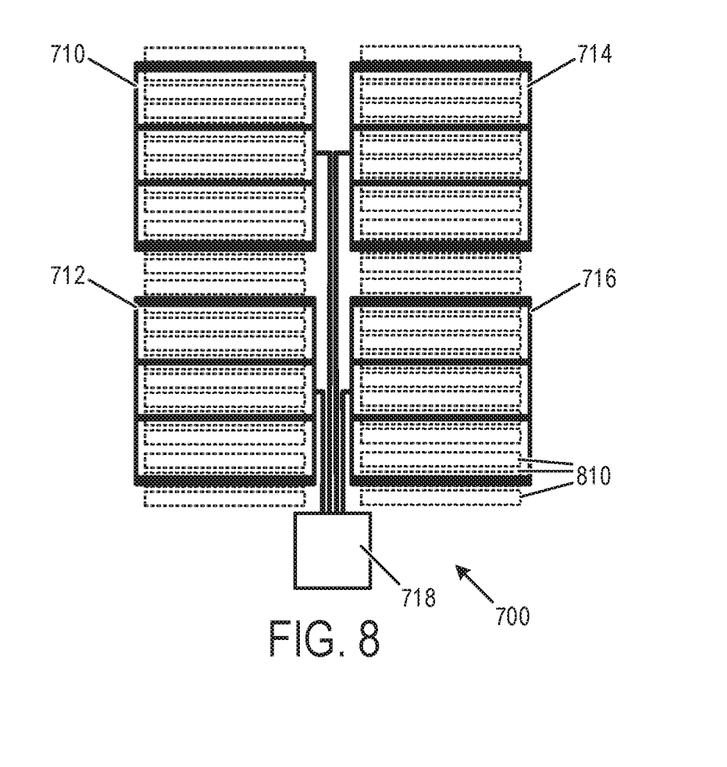

FIG. 8 depicts battery system 700 of FIG. 7 from a front face of the busbars, such as depicted in FIG. 4. In this example, batteries indicated at 810 with broken lines are arranged in a battery array in which each channel of each busbar includes three electrical contacts (e.g., 112) which are in turn electrically connected to a respective battery of the battery array. For example, each electrical contact may be connected (e.g., welded) to a positive or negative terminal of a respective battery. Accordingly, each channel/ridge of each busbar is associated with three batteries of the battery array, and each busbar is associated with twelve batteries of the battery array for a total of forty-eight batteries. In at least some implementations, each electrical contact that projects outward from the busbar may be sandwiched between the front face of the busbar and the electrical terminal of the battery or other electronic component to increase thermal conduction between the busbar and the battery or electrical component. As an additional example, each ridge of each busbar may include two or more ridge segments having a respective set of electrical contacts that may be electrically connected to respective batteries. Continuing with this example, if each ridge includes two ridge segments each having a set of three electrical contacts, then the battery system may include ninety-six batteries. It will be understood that a battery system may include any suitable quantity and arrangement of batteries, and that an array of busbars may include any suitable quantity and arrangement of busbars.

In accordance with an aspect of the present disclosure, an example busbar system, comprises: an electrically conductive busbar having multiple ridges that project from a first side of the busbar, each ridge defining a channel having an opening on a second side of the busbar, wherein interior facing surfaces of each ridge that define the channel are substantially smooth and/or free of protrusions or teeth prior to the ridge being externally crimped; and multiple electrically conductive electrical contacts having a substantially broad and thin configuration, wherein at least one electrical contact is secured within each channel of the busbar by the ridge being externally crimped by a tool having surfaces that include one or more protrusions.

Aspects of the present disclosure may be implemented as a manufacturing method or process. For example, a busbar system (e.g., 100) may be manufactured or otherwise assembled by performing a method that includes inserting a plurality (e.g., two, three, or more) electrical contacts (e.g., 112) into each channel (e.g., 114) of a busbar (e.g., 110); externally crimping opposing external sides of each ridge (e.g., 116) that contain each channel to deform the ridge and retain the plurality of electrical contacts; and welding or otherwise connecting each of the electrical contacts to a respective electrical source or sink (e.g., a battery terminal) to form a battery system (e.g., 700).

It will be understood that the configurations and/or approaches described herein are exemplary in nature, and that these specific implementations or examples are not to be considered in a limiting sense, because numerous variations are possible. The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A busbar system, comprising:
an electrically conductive busbar having multiple ridges that project from a first side of the busbar, each ridge defining a channel having an opening on a second side of the busbar, wherein interior facing surfaces of each ridge that define the channel are substantially smooth and/or free of protrusions or teeth prior to the ridge being externally crimped; and
multiple electrically conductive electrical contacts having a substantially broad and thin configuration, wherein at least one electrical contact is secured within each channel of the busbar by the ridge being externally crimped by a tool having surfaces that include one or more protrusions.

2. The busbar system of claim 1, wherein two or more electrically conductive contacts of the multiple electrically conductive contacts are externally crimped within each channel of the multiple channels.

3. The busbar system of claim 2, wherein the two or more electrically conductive contacts that are externally crimped within each channel are arranged in layers between the two interior facing surfaces of that channel.

4. The busbar system of claim 3, wherein each electrically conductive contact of the multiple electrically conductive contacts take the form of an electrically conductive foil, ribbon, or sheet.

5. The busbar system of claim 1, wherein each electrically conductive contact of the multiple electrically conductive contacts take the form of an electrically conductive foil, ribbon, or sheet.

6. The busbar system of claim 1, wherein each electrically conductive contact of the multiple electrically conductive contacts extend along respective channels of the multiple channels from a first side to a second side of the electrically conductive busbar.

7. The busbar system of claim 1, wherein each electrically conductive contact of the multiple electrically conductive contacts project outward from a respective channel of the multiple channels to contact a respective battery terminal of a battery array.

8. The busbar system of claim 7, further comprising the battery array.

9. A busbar system, comprising:
an electrically conductive busbar having multiple electrically conductive contacts each externally crimped within a respective channel of multiple channels defined by multiple ridges of the electrically conductive busbar to retain the multiple electrically conductive contacts within the multiple channels;
wherein a thinnest dimension of each electrically conductive contact is located between two interior facing surfaces of a respective channel of the multiple channels;
wherein a first dimension of each electrically conductive contact that is larger than the thinnest dimension of that electrically conductive contact extends along a respective channel of the multiple channels; and
wherein a second dimension of each electrically conductive contact that is larger than the thinnest dimension of that electrically conductive contact projects outward from a respective channel of the multiple channels in a direction that opposes the multiple ridges.

10. The busbar system of claim 9, wherein two or more electrically conductive contacts of the multiple electrically conductive contacts are externally crimped within each channel of the multiple channels.

11. The busbar system of claim 10, wherein the two or more electrically conductive contacts that are externally crimped within each channel are arranged in layers between the two interior facing surfaces of that channel.

12. The busbar system of claim 11, wherein each electrically conductive contact of the multiple electrically conductive contacts take the form of an electrically conductive foil, ribbon, or sheet.

13. The busbar system of claim 9, wherein each electrically conductive contact of the multiple electrically conductive contacts take the form of an electrically conductive foil, ribbon, or sheet.

14. The busbar system of claim 9, wherein each electrically conductive contact of the multiple electrically conductive contacts extend along respective channels of the multiple channels from a first side to a second side of the electrically conductive busbar.

15. The busbar system of claim 9, wherein each electrically conductive contact of the multiple electrically conductive contacts project outward from a respective channel of the multiple channels to contact a respective battery terminal of a battery array.

16. The busbar system of claim 15, further comprising the battery array.

17. A method of manufacturing a busbar system, comprising:

inserting a plurality of electrically conductive contacts into each channel of an electrically conductive busbar having multiple channels; and externally crimping opposing sides of each ridge that projects from a first side of the busbar to secure the plurality of electrical conductive contacts within each channel, each ridge defining a respective channel of the multiple channels having an opening on a second side of the busbar.

18. The method of claim 17, wherein interior facing surfaces of each ridge that define the channel are substantially smooth and/or free of protrusions or teeth prior to the ridge being externally crimped.

19. The method of claim 18, wherein the plurality of electrically conductive contacts are secured within each channel of the busbar by the ridge being externally crimped by a tool having surfaces that include one or more protrusions.

20. The method of claim 19, wherein the plurality of electrically conductive contacts that are externally crimped within each channel are arranged in layers between two interior facing surfaces of that channel.

* * * * *